Patented May 8, 1951

2,551,786

UNITED STATES PATENT OFFICE 2,551,786

STABILIZATION OF ORGANIC SUBSTANCES

Charles B. Biswell, Woodstown, N. J., assignor to E. I. du Pont de Nemours & Company, Wilmington, Del., a corporation of Delaware No Drawing. Application April 28, 1949, Serial No. 90,280

20 Claims. (Cl. 252—42.4)

This invention relates to the stabilization of organic substances and particularly to the stabilization of such substances which are subject to deterioration caused by the action of molecular oxygen and catalyzed by metals and their compounds.

Many organic products, such as fats, drying oil, rubber, petroleum products, photographic developers and synthetic unsaturated compounds, are readily attacked by oxygen and the resulting deterioration imparts undesirable qualities to them and eventually destroys their usefulness.

Signal success has been achieved in recent years, in the preservation of many organic substances, by the discovery and use of compounds generically called "oxidation inhibitors" or "antioxidants." These agents, mostly oxidizable organic compounds, retard the auto-catalytic process. Since antioxidants are themselves oxidized in the course of time, as a result of auto-oxidation, the beneficial effect obtained by their use is not permanent, and they protect the organic substances only so long as they are not rendered inactive. They are, moreover, very specific in action, each group of auto-oxidizable substances requiring a different type of antioxidant for the best results.

Certain metals and some of their compounds, when in contact with such organic substances, accelerate the rate of oxidation thereof. Of these, copper is one of the most common and most active and is particularly well known to speed the oxidation of petroleum products and the aging of rubber. Cobalt and its compounds promote the oxidation of drying oils. Also, copper and cobalt and their compounds accelerate the oxidation of aromatic hydroxy and amino antioxidants employed to stabilize such organic substances. Hence, these metals and the antioxidants are antagonistic in action, and the normal inhibiting effect of the latter is greatly reduced in the presence of the former.

Compounds of copper and cobalt occur naturally in many organic products, but often in such slight traces as to cause very little harm. Their concentrations, however, are frequently raised during the handling and utilization of the organic substances; vessels, conduits and bearing metals containing copper are used for storage and transportation or are naturally brought into contact with lubricants; or ingredients contaminated with the metals might be added to the organic subsances.

In recent years, compounds have become known which will react with metals and their catalytically active compounds to form complex compounds which are not catalytically active. Compounds useful for this purpose are generally designated as metal deactivators. In general, a given metal deactivator will be effective with only some of the catalytically active metals and will not be effective with others. Furthermore, many metal deactivators have not been sufficiently effective and hence it has been desired to find metal deactivators having improved effectiveness.

It is an object of the present invention to retard the deterioration of organic substances caused by the action of molecular oxygen and promoted by the presence of copper, cobalt and their catalytically active compounds. Another object is to retard the deterioration of organic substances caused by the action of molecular oxygen and promoted by the presence of copper, cobalt and their catalytically active compounds, and which organic substances contain antioxidants which are normally effective to inhibit the oxidation of such organic substances in the absence of such metals, but which are less effective in the presence of such metals. A more particular object is to inhibit the deterioration of petroleum hydrocarbons in the presence of copper, cobalt and their catalytically active compounds. A further object is to inhibit the deterioration of greases, both in the presence and in the absence of catalytically active metals and their compounds. Other objects are to provide new compositions of matter and to advance the art. Still other objects will appear hereinafter.

The above and other objects may be accomplished by incorporating in organic substances, normally subject to deterioration caused by the action of molecular oxygen and containing a catalyst of the group of copper, cobalt and their compounds, normally effective to catalyze the oxidation of said organic substances, about 0.0001% to about 0.5% by weight of a metal deactivator having the formula

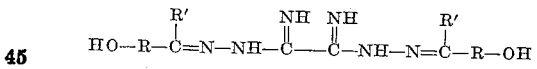

wherein R is an ortho-divalent aromatic radical containing only 1 to 2 benzene rings and which is free of substituents more strongly acidic than phenolic hydroxyl groups and R' represents a member of the group consisting of hydrogen atoms and alkyl groups of 1 to 4 carbon atoms.

I have found that such compounds are exceptionally effective metal deactivators, particularly for copper and its catalytically active compounds. While these metal deactivators of my invention have a higher molecular weight than disalicylal-1,2-propylene diamine and hence a unit weight thereof contains a lesser number of molecules of deactivating compound, they are at least as effective on a weight basis and some of them are more than twice as effective on a weight basis. Disalicylal-1,2-propylene diamine has been recognized as one of the most powerful metal deactivators, particularly for deactivating copper in gasoline. It appears that my metal deactivators functioned by forming very stable complexes with the metals, which complexes are catalytically inactive. While one molecule of most metal deactivators can effectively deactivate only one atom of a metal, one molecule of a metal deactivator of my invention can theoretically deactivate two atoms of a metal by forming a complex which is believed to have the following structural formula

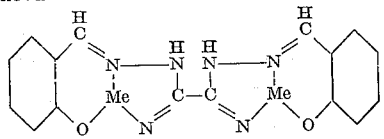

wherein Me represents copper or cobalt.

As a further feature of my invention, I have found that the metal deactivators, herein described, are also effective as antioxidants for lubricating greases, composed of a petroleum oil and a soap. In other words, my metal deactivator compounds will inhibit the oxidation and deterioration of such greases even in the absence of catalytically active metals and their compounds and in the absence of other antioxidant compounds.

While my metal deactivators may be employed in auto-oxidizable organic substances generally, they are particularly desirable in petroleum hydrocarbons, such as cracked gasoline and greases. When they are employed in cracked gasoline, it will generally be desirable to also include an antioxidant of the usual type and my metal deactivators will prevent the catalytic effect of copper, cobalt and their catalytically active compounds on the antioxidant, as well as on the organic substance to be stabilized. This permits the use of those antioxidants which are normally effective in the absence of the metals, but which are less effective in the presence of such metals.

In general, the metal deactivators of my invention have the formula

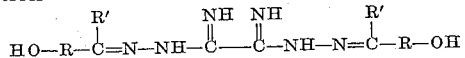

wherein R is an ortho-divalent aromatic radical containing only 1 to 2 benzene rings and which is free of substituents more strongly acidic than phenolic hydroxyl groups and R' represents a member of the group consisting of hydrogen atoms and alkyl groups of 1 to 4 carbon atoms. It will generally be preferred to employ those compounds wherein R' represents hydrogen, in other words, those compounds having the formula

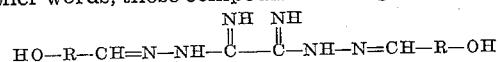

I still further prefer those compounds in which R in the formula is an aromatic radical of the benzene series. The aromatic radicals may contain, as substituents, alkyl, alkoxy, hydroxy and chlorine radicals or atoms, but they should not contain any substituents that are more strongly acidic than the phenolic hydroxyl groups. A particularly preferred class of metal deactivators of my invention is the class of oxalimidic acid, bis (ortho - hydroxy - arylidenehydrazides) in which the arylidene radical contains only 1 to 2 benzene rings. The term "arylidene" is employed in its common restricted sense to designate an aromatic radical which consists of carbon and hydrogen. Representative metal deactivators of my invention, which have proved to be satisfactory for my purposes, are:

Oxalimidic acid, bis(salicylidenehydrazide)
Oxalimidic acid, bis(2-hydroxy-3-methoxybenzylidenehydrazide)
Oxalimidic acid, bis(2-hydroxy-5-methylbenzylidenehydrazide)
Oxalimidic acid, bis(2-hydroxy-3,5-dichlorobenzylidenehydrazide)
Oxalimidic acid, bis(2-hydroxy-1-naphthalhydrazide)
Oxalimidic acid, bis(2-hydroxyacetophenonehydrazide)
Oxalimidic acid, bis(2,4-dihydroxyacetophenonehydrazide)
Oxalimidic acid, bis(2-hydroxy-5-methylacetophenonehydrazide)

Of these, oxalimidic acid, bis(salicylidenehydrazide) and oxalimidic acid, bis(2-hydroxy-3-methoxybenzylidenehydrazide) have proved to be particularly effective and are preferred.

The metal deactivator compounds of my invention may be made by the method disclosed in Chemical Abstracts 31, 4985 (1937) which discloses the preparation of oxalimidic acid, bis(salicylidenehydrazide) by refluxing 1.5 grams of oxalhydrazidine in 100 cc. of alcohol and a little dilute HCl for 2 hours with the equivalent amount of salicylaldehyde and separation of the product from the alcohol in the form of yellow needles melting at 220° C. I have found that the HCl is not necessary and that the preparation can be conveniently conducted in a mixture of alcohol and water. The following is illustrative of my method of preparing the metal deactivators of my invention:

To a mixture of 50 cc. of water and 50 cc. of ethyl alcohol were added 4.5 g. (0.039 mole) of oxalhydrazidine and 10 g. (0.082 mole) of salicylaldehyde. The charge was stirred near the reflux temperature for about one hour. The insoluble product was isolated by filtration and washed. After drying at room temperature, there was obtained 10 g. of a light yellow, bulky solid melting at 220–221° C. This material contained 25.56% nitrogen (by the Dumas method). The theoretical nitrogen content for oxalimidic acid, bis(salicylidenehydrazide) is 25.90%.

The amounts of metal reactivator, which will be added to the organic substances, will be dependent primarily on the amount of catalytic metal present and the stability requirements of the particular organic substance and, to a lesser extent, on the presence or absence of antioxidants and whether the organic substance, in its normal state, is a liquid, semi-solid or solid. Usually, only small proportions of the metal deactivator are necessary to accomplish the desired purpose and generally from about 0.0001% to about 0.5% by weight. In greases, the proportions will preferably be about 0.01% to about 0.5%. Larger amounts of metal deactivator can be employed, but usually without material advantage.

The metal deactivators may be added to the oxidizable organic substance to be stabilized in any desired form or manner. They may be in solid or liquefied form, mixed with other addition agents, or dissolved in a mutual solvent. They may be dissolved or dispersed in the organic substance and may be added to the finished organic substance or to the organic substance at any suitable stage in its manufacture.

In order to more clearly illustrate my invention, preferred modes of carrying the same into effect and advantageous results to be obtained thereby, the following examples are given:

EXAMPLE I

For purposes of illustration, gasoline has been selected as an example of an auto-oxidizable organic substance. The samples of gasoline, used in the following tests, were completely refined thermal cracked naphtha, untreated with chemical agents such as dyes, antioxidants and anti-knocks. The compounds of the present invention were tested in accordance with A. S. T. M. method D-522-46 for the gum stability of gasoline. The results of this test are expressed in terms of "induction period" (in minutes), the period required for oxygen absorption to begin. It has been found that the induction period obtained by this method, although greatly shortened, is a fairly accurate measure of the relative stability of gasoline under normal storage conditions.

N-normal-butyl-p-aminophenol, abbreviated BAP, has been chosen as a representative gasoline antioxidant. The metals, present as catalysts, were employed as their oleates which are hydrocarbon-soluble. The concentrations of the antioxidant and the metal deactivators are given in weight percent in gasoline. The concentrations of the metals are given in parts per million (P. P. M.) by weight of the metal rather than by weight of the metal oleate.

The experimental results, obtained with some of the compounds belonging to the class of deactivators of this invention, are given in the following tables:

Table I

| Conc. BAP, wt. per cent | Conc. Cu., P. P. M. | Deactivator | Conc., wt. per cent | Induction Period, Minutes |
|---|---|---|---|---|
| 0.0 | 0.0 | None | | 115 |
| 0.003 | 0.0 | ----do---- | | 340 |
| 0.003 | 1.0 | ----do---- | | 152 |
| 0.003 | 1.0 | Disalicylal-1,2-propylene diamine | 0.00038 | 335 |
| 0.003 | 1.0 | Oxalimidic acid, bis(salicylidenehydrazide) | 0.00021 | 345 |
| 0.003 | 1.0 | Oxalimidic acid, bis(2-hydroxy-3-methoxybenzylidenehydrazide) | 0.00016 | 340 |
| 0.003 | 1.0 | Oxalimidic acid, bis(2-hydroxy-5-methylbenzylidenehydrazide) | 0.00025 | 350 |
| 0.003 | 1.0 | Oxalimidic acid, bis(2-hydroxy-3,5-dichlorobenzylidenehydrazide) | 0.00025 | 332 |
| 0.003 | 1.0 | Oxalimidic acid, bis(2-hydroxy-1-naphthalhydrazide) | 0.00038 | 340 |
| 0.003 | 1.0 | Oxalimidic acid, bis(2-hydroxy-acetophenonehydrazide) | 0.00038 | 330 |
| 0.003 | 1.0 | Oxalimidic acid, bis(2-hydroxy-5-methylacetophenonehydrazide) | 0.00038 | 320 |

It will be observed that the catalytic effect of copper is counteracted by these compounds.

The action of cobalt on stabilized gasoline and the effect of oxalimidic acid, bis(salicylidenehydrazide) on its activity is shown in Table II.

Table II

| Conc. BAP, wt. per cent | Conc. Cobalt, P. P. M. | Deactivator | Conc., wt. per cent | Induction Period, Minutes |
|---|---|---|---|---|
| 0.0 | 0.0 | None | | 118 |
| 0.003 | 0.0 | ----do---- | | 385 |
| 0.003 | 0.92 | ----do---- | | 278 |
| 0.003 | 0.92 | Oxalimidic acid, bis (salicylidenehydrazide) | 0.001 | 369 |

EXAMPLE II

As another example of my invention, samples of a commercial uninhibited calcium soap grease (composed of a petroleum lubricating oil and a calcium soap) were inhibited with 0.5% by weight of oxalimidic acid, bis(salicylidenehydrazide) and oxalimidic acid, bis(2-hydroxy-3-methoxybenzylidenehydrazide). The products were incorporated into the grease samples by working the grease and the inhibitor together with a spatula on a porcelain plate for one hour.

The grease samples were subjected to an accelerated oxidation stability test. The particular test used is commonly referred to as the "Accelerated Norma-Hoffman Stability Test" and is described in the proceedings of the American Society for Testing Materials, volume 38, Part II, 1938, in an article entitled, "Some applications of an accelerated test for determining the chemical stability of lubricating greases." In this test, a weighted sample of the grease to be tested is charged into a glass container, with or without brass catalyst, and the container is placed in a suitable bomb and subjected to a pressure of 110 pounds of oxygen at 210° to 212° F. for a certain number of hours or until the pressure has dropped a certain number of pounds.

In these experiments, all of the greases were tested with and without the presence of brass disks. The results of the tests are shown in Table III wherein oxalimidic acid, bis(salicylidenehydrazide) is indicated by the letter A and oxalimidic acid, bis(2-hydroxy-3-methoxybenzylidenehydrazide) is represented by the letter B.

Table III

| | Norma-Hoffman Stability Test | | | |
|---|---|---|---|---|
| | With Brass | | Without Brass | |
| | Hours | Pounds Pressure Drop | Hours | Pounds Pressure Drop |
| Grease (uninhibited) | 18 | 25 | 71 | 25 |
| Grease+0.5% A | 371 | 25 | 500 | 14 |
| Grease+0.5% B | 184 | 25 | 360 | 13 |

It will be observed that these compounds are effective grease stabilizers even in the absence of the conventional antioxidants used in lubricating greases.

It will be understood that the preceding examples are given for illustrative purposes solely and that my invention is not limited to the specific embodiments disclosed therein. It will be readily apparent to those skilled in the art that many variations and modifications can be made without departing from the spirit or scope of my invention. The antioxidants employed with the metal deactivators may be widely varied as suited to the particular organic substance to be stabilized. The catalytic metal may be dissolved or dispersed in the organic substance or may be in bulk form in intimate contact with the organic substance as in the case of containers, conduits, bearings and the like. Mixtures of two or more metal deactivators of my invention may be employed and the metal deactivators themselves may be of the unsymmetrical type, in that, they may be made from mixtures of two or more aldehydes or ketones or both.

From the preceding disclosure, it will be apparent that, by my invention, I am able to more effectively stabilize organic substances, and particularly petroleum hydrocarbons, against catalytic effects of copper, cobalt and their catalytically active compounds. It will also be particularly noted that my compounds are especially effective as antioxidants, as well as metal deactivators, in greases. It will, therefore, be apparent that my invention constitutes a valuable contribution and advance in the art.

I claim:

1. A composition comprising an organic substance, boiling above atmospheric temperatures at atmospheric pressures, normally subject to deterioration caused by the action of molecular oxygen, containing a catalyst of the group consisting of copper, cobalt and their compounds, normally effective to catalyze oxidation of said organic substance, and having incorporated therein about 0.0001% to about 0.5% by weight of a metal deactivator having the formula

wherein R is an ortho-divalent aromatic radical containing only 1 to 2 benzene rings and which is free of substituents more strongly acidic than phenolic hydroxyl groups and R' represents a member of the group consisting of hydrogen atoms and alkyl groups of 1 to 4 carbon atoms.

2. A composition comprising an organic substance, boiling above atmospheric temperatures at atmospheric pressures, normally subject to deterioration caused by the action of molecular oxygen, containing a catalyst of the group consisting of copper, cobalt and their compounds, normally effective to catalyze oxidation of said organic substance, and having incorporated therein about 0.0001% to about 0.5% by weight of a metal deactivator having the formula

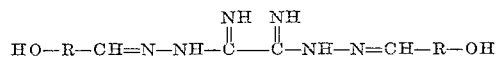

wherein R is an ortho-divalent aromatic radical containing only 1 to 2 benzene rings and which is free of substituents more strongly acidic than phenolic hydroxyl groups.

3. A composition comprising an organic substance, boiling above atmospheric temperatures at atmospheric pressures, normally subject to deterioration caused by the action of molecular oxygen, containing a catalyst of the group consisting of copper, cobalt and their compounds, normally effective to catalyze oxidation of said organic substance, and having incorporated therein about 0.0001% to about 0.5% by weight of a metal deactivator having the formula

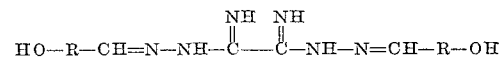

wherein R is an ortho-divalent aromatic radical of the benzene series and which is free of substituents more strongly acidic than phenolic hydroxyl groups.

4. A composition comprising an organic substance, boiling above atmospheric temperatures at atmospheric pressures, normally subject to deterioration caused by the action of molecular oxygen, containing a catalyst of the group consisting of copper, cobalt and their compounds, normally effective to catalyze oxidation of said organic substance, and having incorporated therein about 0.0001% to about 0.5% by weight of a metal deactivator which metal deactivator is an oxalimidic acid, bis(ortho-hydroxy-arylidenehydrazide) in which the arylidene radical contains only 1 to 2 benzene rings.

5. A composition comprising an organic substance boiling above atmospheric temperatures at atmospheric pressures, normally subject to deterioration caused by the action of molecular oxygen, containing a catalyst of the group consisting of copper, cobalt and their compounds, normally effective to catalyze oxidation of said organic substance, and having incorporated therein about 0.0001% to about 0.5% by weight of a metal deactivator which metal deactivator is an oxalimidic acid, bis(ortho-hydroxy-arylidenehydrazide) in which the arylidene radical is of the benzene series.

6. A composition comprising an organic substance, boiling above atmospheric temperatures at atmospheric pressures, normally subject to deterioration caused by the action of molecular oxygen, containing a catalyst of the group consisting of copper, cobalt and their compounds, normally effective to catalyze oxidation of said organic substance, and having incorporated therein about 0.0001% to about 0.5% by weight of a metal deactivator which metal deactivator is oxalimidic acid, bis(salicylidenehydrazide).

7. A composition comprising an organic substance, boiling above atmospheric temperatures at atmospheric pressures, normally subject to deterioration caused by the action of molecular oxygen, containing a catalyst of the group consisting of copper, cobalt and their compounds, normally effective to catalyze oxidation of said organic substance, and having incorporated therein about 0.0001% to about 0.5% by weight of a metal deactivator which metal deactivator is oxalimidic acid, bis(2-hydroxy-2-methoxybenzylidenehydrazide).

8. A composition comprising liquid petroleum hydrocarbons, normally subject to deterioration caused by the action of molecular oxygen, containing a catalyst of the group consisting of copper, cobalt and their compounds, normally effective to catalyze oxidation of said petroleum hydrocarbons, and having incorporated therein about 0.0001% to about 0.5% by weight of a metal deactivator having the formula

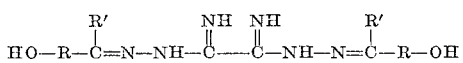

wherein R is an ortho-divalent aromatic radical containing only 1 to 2 benzene rings and which is free of substituents more strongly acidic than phenolic hydroxyl groups and R' represents a member of the group consisting of hydrogen atoms and alkyl groups of 1 to 4 carbon atoms.

9. A composition comprising liquid petroleum hydrocarbons, normally subject to deterioration caused by the action of molecular oxygen, containing a catalyst of the group consisting of copper, cobalt and their compounds, normally effective to catalyze oxidation of said petroleum hydrocarbons, and having incorporated therein about 0.0001% to about 0.5% by weight of a metal deactivator having the formula

wherein R is an ortho-divalent aromatic radical containing only 1 to 2 benzene rings and which is free of substituents more strongly acid than phenolic hydroxyl groups.

10. A composition comprising liquid petroleum hydrocarbons, normally subject to deterioration caused by the action of molecular oxygen, containing a catalyst of the group consisting of copper, cobalt and their compounds, normally effective to catalyze oxidation of said petroleum hydrocarbons, and having incorporated therein about 0.0001% to about 0.5% by weight of a metal deactivator having the formula

wherein R is an ortho-divalent aromatic radical of the benzene series and which is free of substituents more strongly acidic than phenolic hydroxyl groups.

11. A composition comprising liquid petroleum hydrocarbons, normally subject to deterioration caused by the action of molecular oxygen, containing a catalyst of the group consisting of copper, cobalt and their compounds, normally effective to catalyze oxidation of said petroleum hydrocarbons, and having incorporated therein about 0.0001% to about 0.5% by weight of a metal deactivator which metal deactivator is an oxalimidic acid, bis(ortho-hydroxy-arylidenehydrazide) in which the arylidene radical contains only 1 to 2 benzene rings.

12. A composition comprising liquid petroleum hydrocarbons, normally subject to deterioration caused by the action of molecular oxygen, containing a catalyst of the group consisting of copper, cobalt and their compounds, normally effective to catalyze oxidation of said petroleum hydrocarbons, and having incorporated therein about 0.0001% to about 0.5% by weight of a metal deactivator which metal deactivator is an oxalimidic acid, bis(ortho - hydroxy - arylidenehydrazide) in which the arylidene radical is of the benzene series.

13. A composition comprising liquid petroleum hydrocarbons, normally subject to deterioration caused by the action of molecular oxygen, containing a catalyst of the group consisting of copper, cobalt and their compounds, normally effective to catalyze oxidation of said petroleum hydrocarbons, and having incorporated therein about 0.0001% to about 0.5% by weight of a metal deactivator which metal deactivator is oxalimidic acid, bis(salicylidenehydrazide).

14. A composition comprising liquid petroleum hydrocarbons, normally subject to deterioration caused by the action of molecular oxygen, containing a catalyst of the group consisting of copper, cobalt and their compounds, normally effective to catalyze oxidation of said petroleum hydrocarbons, and having incorporated therein about 0.0001% to about 0.5% by weight of a metal deactivator which metal deactivator is oxalimidic acid, bis(2-hydroxy-3-methoxybenzylidenehydrazide).

15. A grease composed of a petroleum oil and a soap having incorporated therein about 0.001% to about 0.5% by weight of a compound having the formula

wherein R is an ortho-divalent aromatic radical containing only 1 to 2 benzene rings and which is free of substituents more strongly acidic than phenolic hydroxyl groups and R' represents a member of the group consisting of hydrogen atoms and alkyl groups of 1 to 4 carbon atoms.

16. A grease composed of a petroleum oil and a soap having incorporated therein about 0.001% to about 0.5% by weight of a compound having the formula

wherein R is an ortho-divalent aromatic radical containing only 1 to 2 benzene rings and which is free of substituents more strongly acidic than phenolic hydroxyl groups.

17. A grease composed of a petroleum oil and a soap having incorporated therein about 0.001% to about 0.5% by weight of a compound having the formula

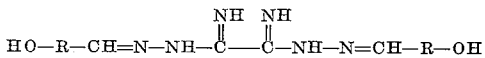

wherein R is an ortho-divalent aromatic radical of the benzene series and which is free of substituents more strongly acidic than phenolic hydroxyl groups.

18. A grease composed of a petroleum oil and a soap having incorporated therein about 0.001% to about 0.5% by weight of an oxalimidic acid, bis(ortho-hydroxy-arylidenehydrazide) in which the arylidene radical is of the benzene series.

19. A grease composed of a petroleum oil and a soap having incorporated therein about 0.001% to about 0.5% by weight of oxalimidic acid, bis(salicylidenehydrazide).

20. A grease composed of a petroleum oil and a soap having incorporated therein about 0.001% to about 0.5% by weight of oxalimidic acid, bis(2-hydroxy-3-methoxybenzylidenehydrazide).

CHARLES B. BISWELL.

REFERENCES CITED

The following references are of record in the file of this patent:

UNITED STATES PATENTS

| Number | Name | Date |
|---|---|---|
| 2,282,513 | Downing et al. | May 12, 1942 |
| 2,353,690 | Clarkson | July 18, 1949 |